Nov. 10, 1964 E. J. VAUGHN 3,156,771

TELEPHONE LOUD-SPEAKER COMBINATION

Filed Nov. 14, 1960

INVENTOR
ELIJAH JAMES VAUGHN
BY
Frederick C. Meyers
ATTORNEY

United States Patent Office
3,156,771
Patented Nov. 10, 1964

3,156,771

TELEPHONE LOUD-SPEAKER COMBINATION

Elijah J. Vaughn, 1701 Portland Ave. S., Minneapolis, Minn.

Filed Nov. 14, 1960, Ser. No. 69,197
5 Claims. (Cl. 179—1)

This invention relates to telephonic communication and more particularly to a combinaton including a conventional desk-type telephone and a telephonic sound amplifying system.

An important object of this invention is to provide co-operatively functioning elements in combination with a conventional telephone which will make it possible for a conventional type telephone to be utilized by a group of people.

Another object is to provide a switch mechanism which controls the telephone amplifying system while simultaneously controlling the telephone handset actuating buttons thereby making it possible to utilize the system without transferring the telephone handset from the telephone cradle to the amplifier box.

A further object of this invention is to provide a switch mechanism as described above which is readily attached to or detached from the chassis of a conventional desk-type telephone without modification of the phone chassis itself.

A still further object is to provide a simple switch mechanism as described above with a holding means which frictionally engages a vertically movable arm when the mechanism is in the off position and which is easily released for allowing the arm to spring free to the on position under the spring biased force of the telephone handset actuating buttons.

A further object is to provide electronic amplification of a remotely emitted voice sound prior to its being intercepted by the telephone transmitter and subsequent transmission to the receiving party.

Among the many known advancements in the field of telephonic communication and sound amplification has been an arrangement whereby the telephone handset mechanism of the modern conventional desk-type telephone is positioned in relation to a sound amplifier box such that the sound emitted by the receiver is picked up, amplified to the normal audio level and then played through a speaker. In this manner, the listening level of the sound emanating from the receiver is amplified so that it can be head at a normal voice level several feet from the speaker and likewise several feet from the telephone handset thereby providing the telephonic sound available to more than one person. In a somewhat similar manner, a person listening to the amplified sound may speak several feet from the amplifier box and by means of acoustical pick-up, the voice may be heard by the sending party or person on the other end of the telephone conversation.

In spite of the many advantages of this combination, an objectionable drawback to its use stems from the fact that the person sending or receiving a call must transfer the telephone handset from the phone chassis to the amplifier box, and then turn on a power switch whereby the sound amplifier is energized. If the individual turns the power switch on first and then transfers the telephone handset to the amplifier box, the many knocking and thudding sounds, which are so easily picked up in a receiver when it is bumped even slightly, are then amplified to a point of being objectionable when heard emanating from the speaker.

Once the telephone conversation is completed, the person must then remove the telephone handset from its holder, replace it on the telephone chassis so as to open the telephone handset circuit and then turn off the amplifier so as to avoid useless power consumption.

From the above, it is seen that transferring the telephone handset from the phone chassis to the amplifier box in preparation of a call or in answer to a call and then transferring the telephone handset back after the conversation is over is a time consuming and objectionable feature as are the noises therewith associated.

Another objectionable feature of the present telephone loud-speaker systems is that associated with the marginal operation of the acoustical sound pick-up method incorporated for transmitting the individual's voice to the sending party. This is done under present designs by acoustical sound reflections with no electronic amplification whatsoever.

Through my invention, I have devised a means for accomplishing the same objectives as are presently met with the telephone lour-speaker system, but without the objectionable features therewith associated as pointed out above.

These and other objects and advantages of my invention will more fully appear from the following description, made in connection with the accompanying drawing wherein like reference characters refer to the same or similar parts or designations throughout the several views and in which.

Figure 1:
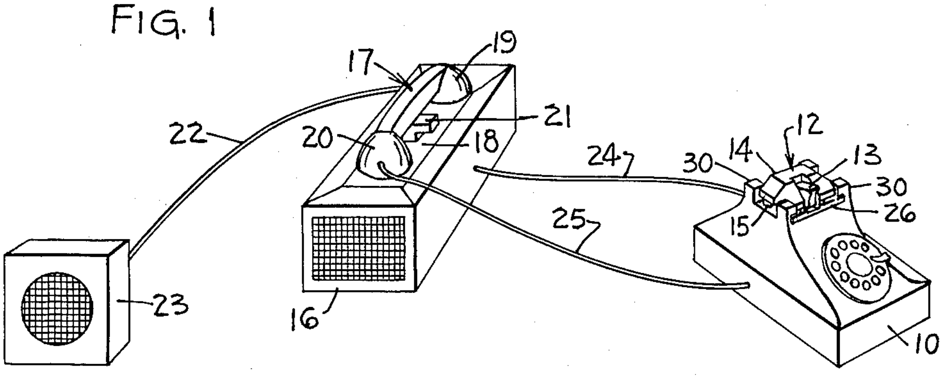
FIGURE 1 is a pictorial view showing a typical arrangement of the elements when in actual use.

Referring now to FIGURE 1, a conventional telephone chassis 10 has mounted thereon in the cradle 11 a switch mechanism 12. When the telephone is not in use, latch 13 is seated in an upper notch 13*a* located in cradle arm 14 and is held in such a position by a bias spring on latch 13. Arm 14, in turn, extends across the cradle 11 from one cradle button 15 to the other. When the telephone is in use, latch 13 is manually unseated thereby releasing the cradle arm 14 and the cradle buttons 15 for upward lateral movement, the cradle buttons themselves being spring biased. At the same time the cradle arm moves upwardly upon being released from the latch 13, the cradle buttons in the same movement close the telephone handset circuit. In addition, a small power switch enclosed within the switch mechanism is closed whereby battery power is made available to the amplifier box 16. The construction and operation of switch mechanism 12 will be explained in more detail later with reference to FIGURE 2.

The amplifier box 16 is comprised of four basic units. These are: a microphone, a transmitter amplifier, a receiver amplifier and a telephone handset saddle.

When the sound amplifying system is in use, the telephone handset 17 of the telephone is placed in the amplifier box saddle portion or seating means 18, formed by a concave depression in the upper face of the amplifier box 16, with a receiver 19 and transmitter 20 properly positioned for their respective functions. By its own weight, the telephone handset 17 energizes a centrally located interlock switch 21 located on the upper face portion of the saddle. This interlock switch closes a source of power to the amplifiers located in the amplifier box 16 and is wired in series connection with the switch mechanism 12 so that excessive battery drainage is thereby avoided as will be explained in detail later.

A speaker cable 22 may connect a speaker 23 with the receiver amplifier so that it may be positioned at any desired distance from the amplifier box. Thus where feedback is a problem, speaker 23 may be moved to a remote location to prevent feedback sounds.

Also emanating from the amplifier box 16 is a power switch control line 24 which is a two wire electrical connection between switch mechanism 12, positioned on the telephone chassis 10, and the amplifier box power supply (and interlock switch 21). Since an object of this invention is to provide a sound amplification system without modification of the telephone handset or telephone chassis, it is imperative that the telephone cord 25 not be altered. Because the telephone cord 25 therefore is the limiting factor in positioning distance between the telephone chassis 10 and amplifier box 16, the power switch control line 24 is accordingly cut to a comparable length.

Figures 2, 3:
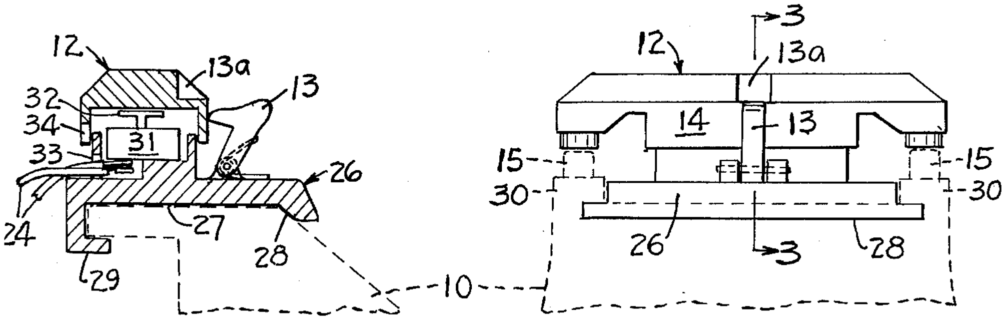
FIGURE 2 is an enlarged frontal view of the switch mechanism as it is mounted on the upper portion of the phone chassis, portions of the phone chassis not necessary to the understanding of this invention being omitted.
FIGURE 3 is a vertical cross-sectional view of the switch mechanism as shown in FIGURE 2 with various components represented in full line drawing.

Referring now to FIGURE 2, the switch mechanism 12 is shown positioned on the upper portion of the telephone chassis 10. In this particular view, the latch 13 has been released so as to allow the arm 12 to rise under the spring bias of the cradle buttons 15. In this unlatched position, the upwardly positioned cradle buttons 15 have closed the telephone handset circuit thereby allowing a telephone conversation to take place.

The base 26 of the switch mechanism is comprised of a solid piece 27 having an abutting front piece 28 and a depending rear lip 29 which are more clearly shown in FIGURE 3. As shown in FIGURE 2, the abutting front piece lies immediately adjacent and forward of the cradle mounts 30. In this manner, the cradle mounts 30 and the rear lip 29 on the base 26 provide a securing means to prevent forward or backward slippage of the base. It will be also noted that the base 26 fits between the cradle mounts 30 with sufficient clearance for easy installation but with minimum clearance to avoid sideway slipage.

Referring now more specifically to FIGURE 3, a cross-sectional view taken at 3—3 of FIGURE 2 is shown revealing the inside of the switch mechanism 12 and its relation to the other elements thereof. The arm switch 31, internally located, has a spring contact 32 with the cradle arm 14 which, when released by releasing cradle arm 14, activates the arm switch 31 to close the power circuit to the amplifier box 16. In a similar manner, when the cradle arm is depressed thereby depressing spring contact 32, the arm switch 31 opens the power circuit to the amplifier box 16. Located in the rear wall of the arm switch compartment are holes 33 which allow free passage of the power switch control line 24 from the arm switch 31 externally to the amplifier box 16. So as to accommodate such an opening, when the cradle arm is in the depressed position, a small portion 34 of the cradle arm rear guide is removed.

Figure 4:
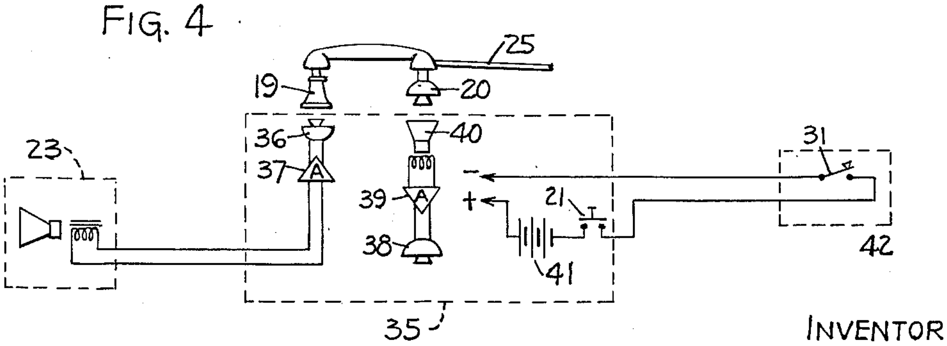
FIGURE 4 is a schematic diagram of the electrical elements with physical enclosure boundaries represented by dotted lines.

In reference to FIGURE 4, only a brief description of such a schematic diagram is necessary as is understood by those skilled in the electrical art. Within the dotted line boundary 35 is located a microphone 36 which receives the transmitted sound from the receiver 19 which, in turn, feeds the electrical signal to the speaker amplifier 37. The speaker amplifier 37, in turn, supplies its output to the speaker 23 represented in dotted line enclosure 23.

Also in the dotted line enclosure 35 is a microphone 38 which picks up the room sounds and normal voices at the usual audio level and transmits such sound to its amplifier 39. This amplifier, in turn, supplies its output to a miniature speaker 40 which provides a positive means of communicating the individual's conversation into the transmitter 20. The batteries 41 are also shown within enclosure 35 as is the interlock switch 21.

Within the dotted line enclosure 42 is the arm switch 31 which, as shown in FIGURE 3, is located within the switch mechanism 12 and electrically connects with the amplifier box 16.

Observing FIGURE 4, it can readily be seen that both the arm switch 31 and the interlock switch 21 must be closed before power will be supplied to the amplifier box amplifiers. By the very act of positioning the telephone handset in the amplifier box saddle 18, the interlock switch 21 is closed. Thereafter, whenever the arm switch 31 is closed by releasing cradle arm 14, power will be supplied to amplifiers 37 and 39 and they will be in an "on condition" amplifying whatever sounds are picked up by microphones 36 and 38.

When my invention is in actual use, the telephone chassis 10 may be located at any convenient position which does not appreciably restrict a versatile location of the amplifier box 16. The phone chassis 10 may be located on a shelf or on a desk top or other convenient place which is readily accessible for operation of the switch mechanism 12 when the phone rings, or for initial operation by the individual himself i.e. placing a call. The amplifier box 16 must be positioned with respect to the communicating in the room so that the voice sound microphone is positioned for optimum sound pick-up. When my sound amplifying system is used, it will become apparent that it is not necessary to transfer the telephone handset from the telephone chassis to the amplifier box for each individual call, but may be placed in the amplifier box to remain there indefinitely or until the individual wishes to no longer use the amplifying system.

As explained above, the speaker may be located in any position suitable to the receiving party with the only restriction that it not be directed at the sound pick-up of the amplifier box whence objectionable feedback would be caused.

If the individual wishes to make a telephone call with my invention, he simply releases the latch 13 with a touch of the finger in a downwardly and outwardly movement so as to release the cradle arm 12 and cradle buttons 15 which in turn close the telephone handset connections. As explained above, the amplifiers are simultaneously energized and the party may thereafter carry on his conversation.

It may readily be seen from the foregoing that my invention provides a positive means for sound amplification, of both the sending voice and receiving voice, with a maximum of convenience to the individual and a minimum of battery drainage when the system is not in use.

It will, of course, be understood that various changes may be made in the form, details, arrangement and proportions of the parts without departing from the scope of my invention as set forth in the appended claims.

What is claimed is:

1. A telephone loud-speaker combination comprising:
(*a*) a telephone having a telephone handset with an electrical circuit including a transmitter and receiver, and a telephone chassis having a cradle and vertically movable switch button means therewith associated, the vertical disposition of said switch button means controlling the opening and closing of said electrical circuit,
(*b*) said telephone handset being electrically connected to said telephone chassis,
(*c*) an amplifier box having a seating means for holding said telephone handset,
(*d*) said seating means having openings for communition of sound energy between said transmitter and receiver and the inside of said amplifier box,
(*e*) sound treating means contained within said amplifier box for modifying sounds associated with each of said transmitter and receiver, said sound treating means including means for detecting sound associated with said transmitter and receiver and being of a first energy level, means for converting said detected sound to an electrical signal, and means for converting said amplified electrical signal to sound energy having an energy level greater than said first energy level and being in the normal audio energy level, (*f*) means for de-energizing said amplifying means, (*g*) a speaker positioned remotely with respect to said amplifier box, (*h*) means for electrically connecting said amplified electrical signals from said amplifier box to said speaker, and (*i*) a manually operable switch mechanism removably mounted on said telephone chassis cradle and in activating contact with said switch button means, (*j*) whereby said transmitter and receiver will be de-energized without requiring replacement thereof in said telephone chassis cradle.

2. A telephone loud-speaker combination as set forth in claim 1 wherein said manually operable switch mechanism comprises:

(*a*) a base mounted on said telephone cradle, and (*b*) a vertically movable horizontal cradle arm extending across said telephone cradle and in overlying contact with said switch button means, (*c*) said cradle arm being depressible toward and releasably latched to said base when in a depressed position, 3. A telephone loud-speaker combination comprising:

(*a*) a telephone having a telephone handset with an electrical circuit including a transmitter and receiver, and a telephone chassis having a cradle and vertically movable switch button means therewith associated, the vertical disposition of said switch button means controlling the opening and closing of said electrical circuit, (*b*) said telephone handset being electrically connected to said telephone chassis, (*c*) an amplifier box having a seating means for holding said telephone handset, (*d*) said seating means having openings for communication of sound energy between said transmitter and receiver, and the inside of said amplifier box, (*e*) sound treating means contained within said amplifier box for modifying sounds associated with each of said transmitter and receiver, said sound treating means including means for detecting sound associated with said transmitter and receiver and being of a first energy level, means for converting said detected sound to an electrical signal, means for converting said amplified electrical signal to sound energy having an energy level greater than said first energy level and being in the normal audio energy level, (*f*) an electrical power supply for said amplifying means, (*g*) a speaker positioned remotely with respect to said amplifier box, (*h*) means for electrically connecting said amplified electrical signals from said amplifier box to said speaker, (*i*) a manually operable switch mechanism removably mounted on said telephone chassis cradle and in activating contact with said switch button means, (*j*) an arm switch contained within said manually operable switch mechanism for closing the circuit of said electrical power supply upon said amplifying means simultaneously with the operation of said switch buttons of said telephone chassis, and (*k*) means electrically connecting said arm switch with said power supply and said sound treating means.

4. A telephone loud-speaker combination comprising:

(*a*) a telephone having a telephone handset with an electrical circuit including a transmitter and receiver, and a telephone chassis having a cradle and vertically movable switch button means therewith associated, the vertical disposition of said switch button means controlling the opening and closing of said electrical circuit, (*b*) said telephone handset being electrically connected to said telephone chassis, (*c*) an amplifier box having a seating means for holding said telephone handset, (*d*) said seating means having openings for communication of sound energy between said transmitter and receiver, and the inside of said amplifier box, (*e*) first sound treating means contained within said amplifier box for modifying sounds associated with said receiver, said first sound treating means including means for detecting sound associated with said receiver and being of a first energy level, means for converting said detected sound to an electrical signal, means for amplifying said electrical signal, and means for converting said amplified electrical signal to sound energy having an energy level greater than said first energy level, the arrangement being such that the input to said first sound treating means is substantially that of the receiver output, (*f*) a speaker positioned remotely with respect to said amplifier box, (*g*) means for electrically connecting said amplified electrical signals from said first sound treating means to said speaker, (*h*) second sound treating means associated with said transmitter and including an input communicating externally of said amplifier box, said input including means for detecting sound, means for converting said detected sound to an electrical signal, means for amplifying said electrical signal, and output means for converting said amplified electrical signal to sound energy, said output means being in communication with said transmitter, (*i*) an electrical power supply for each of said amplifying means, (*j*) a switch mechanism removably mounted on said telephone cradle in button activating contact with said switch button means, and (*k*) an arm switch contained within said switch mechanism which is activated simultaneously with said switch buttons, (*l*) means electrically connecting said arm switch with said power supply and each of said sound treating means.

5. A telephone loud-speaker combination comprising:

(*a*) a telephone having a telephone handset with an electrical circuit including a transmitter and receiver, and a telephone chassis having a cradle and vertically movable switch button means therewith associated, the vertical disposition of said switch button means controlling the opening and closing of said electrical circuit, (*b*) said telephone handset being electrically connected to said telephone chassis, (*c*) an amplifier box having a seating means for holding said telephone handset, (*d*) said seating means having openings for communication of sound energy between said transmitter and receiver, and the inside of said amplifier box, (*e*) a spring biased interlock power switch located between said openings of said seating means which is closed when said handset is positioned in said seating means, (*f*) sound treating means contained within said amplifier box for modifying sounds associated with each of said transmitter and receiver, said sound treating means including means for detecting sound associated with said transmitter and receiver and being of a first energy level, means for converting said detected sound to an electrical signal, means for amplifying said electrical signal, and means for converting said amplified electrical signal to sound energy having an energy level greater than said first energy level and being in the normal audio energy level, (*g*) an electrical power supply for said sound treating means, (*h*) a speaker positioned remotely with respect to said amplifier box, (*i*) means for electrically connecting said amplified electrical signals from said amplifier box to said speaker, (*j*) a manually operable switch mechanism removably mounted on said telephone chassis cradle and in activating contact with said switch button means, (*k*) an arm switch contained within said manually operable switch mechanism for closing the circuit of said electrical power supply upon said amplifying means simultaneously with the operation of said switch buttons of said telephone chassis, and (*l*) said arm switch being connected in series with said interlock power switch, (*m*) means electrically connecting said arm switch with said power supply and said amplifying means.

References Cited in the file of this patent

UNITED STATES PATENTS

| | | |
|---|---|---|
| 2,071,053 | Varley | Feb. 16, 1937 |
| 2,402,341 | Patterson | June 18, 1946 |